US010621878B2

(12) United States Patent
Scacchi et al.

(10) Patent No.: US 10,621,878 B2
(45) Date of Patent: Apr. 14, 2020

(54) DEVICE, SYSTEM AND METHOD FOR ASSISTING THE TAXIING OF AN AIRCRAFT

(71) Applicant: Airbus Operations S.A.S., Toulouse (FR)

(72) Inventors: Pierre Scacchi, Toulouse (FR); Thibault Lefez, Toulouse (FR)

(73) Assignee: Airbus Operations S.A.S. (FR)

( * ) Notice: Subject to any disclaimer, the term of this patent is extended or adjusted under 35 U.S.C. 154(b) by 236 days.

(21) Appl. No.: 15/562,709

(22) PCT Filed: Apr. 4, 2016

(86) PCT No.: PCT/EP2016/057316
§ 371 (c)(1),
(2) Date: Sep. 28, 2017

(87) PCT Pub. No.: WO2016/162297
PCT Pub. Date: Oct. 13, 2016

(65) Prior Publication Data
US 2018/0090019 A1    Mar. 29, 2018

(30) Foreign Application Priority Data
Apr. 10, 2015  (FR) ..................... 15 53117

(51) Int. Cl.
*G08G 5/06*   (2006.01)
*G01C 23/00*  (2006.01)
*G08G 5/00*   (2006.01)

(52) U.S. Cl.
CPC ............ *G08G 5/065* (2013.01); *G01C 23/00* (2013.01); *G08G 5/0008* (2013.01); *G08G 5/0021* (2013.01); *G08G 5/0078* (2013.01)

(58) Field of Classification Search
CPC ..................................................... G08G 5/065
See application file for complete search history.

(56) References Cited

U.S. PATENT DOCUMENTS 7,979,197 B2    7/2011  Finn et al.
2008/0204360 A1*  8/2008  Schmidt ................. G02B 27/01
                                          345/7

(Continued)

FOREIGN PATENT DOCUMENTS

EP    2 485 206 A1    8/2012

OTHER PUBLICATIONS

PCT/EP2016/057316 Search Report dated Jun. 27, 2016.

*Primary Examiner* — Imran K Mustafa
(74) *Attorney, Agent, or Firm* — Lerner, David, Littenberg, Krumholz & Mentlik, LLP (57) ABSTRACT

In an aircraft including a cockpit, a unit for monitoring the situation of the aircraft and a radio communication unit, the device for aiding the ground rolling is configured to: acquire, from the monitoring unit, information the situation of the aircraft and determine predicted positions of the aircraft for a set of future instants, and for each vehicle of a set of other vehicles situated on the surface of the airport: acquire, from the radio communication unit, information regarding the situation of the vehicle, which information is transmitted by this vehicle, determine predicted positions of the vehicle and calculate a distance between the predicted position of the aircraft and the predicted position of the vehicle for each instant of the set of future instants and compare this distance with a predetermined distance threshold and, emit an alert in the cockpit if this distance is less than this distance threshold.

10 Claims, 4 Drawing Sheets

(56) References Cited

U.S. PATENT DOCUMENTS

2009/0115637 A1   5/2009  Naimer et al.
2012/0200433 A1*  8/2012  Glover .................. G08G 5/065
                                                340/971

* cited by examiner

DEVICE, SYSTEM AND METHOD FOR ASSISTING THE TAXIING OF AN AIRCRAFT

CROSS-REFERENCE TO RELATED APPLICATIONS

The present application is a national phase entry under 35 U.S.C. § 371 of International Application No. PCT/EP2016/057316, filed Apr. 4, 2016, published in French, which claims priority from French Patent Application No. 1553117 filed Apr. 10, 2015, the entire disclosures of which are hereby incorporated herein by reference.

The invention relates to a device, a system and a method for assisting the taxiing of an aircraft as well as to an aircraft comprising such a device and/or such a taxiing assistance system.

Aircraft, in particular passenger transport aircraft, have to taxi on airport surfaces. The taxiing generally takes place between a passenger embarkation gate and a takeoff (or landing) runway and vice-versa. In order to do this, the pilot of the aircraft must maneuver the aircraft on the airport surface. The pilot must in particular take care that the aircraft, in particular extreme parts of the latter such as the wings, does not touch another vehicle situated on the airport surface. Such another vehicle can correspond to another aircraft or to a service vehicle, for example a passenger transport bus, a refueling tanker, a baggage cart, etc. In order to assist the pilot in this task, certain aircraft, in particular aircraft having large dimensions are provided with a camera and a screen in the cockpit making it possible to display images captured by the camera. The camera is generally placed on the vertical stabilizer, which makes it possible to obtain images of the top of the fuselage as well as the environment of the aircraft. These images make it possible to assist the pilot in maneuvering the aircraft. The document EP0.980.828 describes a system for assisting the taxiing of an aircraft comprising such cameras. However, the images coming from the camera generally allow only a limited view of the environment of the aircraft, which does not make it possible to see vehicles situated outside of the field of view of the camera. Moreover, the images coming from the camera are of limited interest in the case of unfavorable meteorological conditions, for example in the case of fog. It would be advantageous to have, on board the aircraft, information making it possible to assist the pilot in maneuvering the aircraft with better anticipation, due to the equal awareness of the presence of vehicles situated outside of the field of view as well as within the field of view of such a camera.

DESCRIPTION OF THE INVENTION

The purpose of the present invention is notably to provide a solution to these problems. It relates to a device for assisting the taxiing of an aircraft on the surface of an airport, this aircraft comprising:
  a cockpit comprising a display screen;
  a unit for monitoring the situation of the aircraft; and
  a radio communication unit.
This device for assisting taxiing is noteworthy in that it is configured for:
a) acquiring, from the unit for monitoring the situation of the aircraft, situation of the aircraft information;
b) determining predicted positions of the aircraft for a set of future times, on the basis of at least said situation of the aircraft information,
and
for each vehicle of a set of other vehicles situated on the surface of the airport:
c) acquiring, from the radio communication unit, situation of the vehicle information transmitted by that vehicle;
d) determining predicted positions of the vehicle for that set of future times, on the basis of at least said situation of the vehicle information;
e) computing a distance between the predicted position of the aircraft and the predicted position of the vehicle for each time of the set of future times and comparing that distance with a predetermined distance threshold; and
f) emitting a warning in the cockpit of the aircraft if that distance is less than that predetermined distance threshold for at least one time of the set of future times, by displaying at least one indication on said display screen in the cockpit.

Thus, thanks to this device, the pilot of the aircraft is warned if the distance between the predicted positions of the aircraft and another vehicle, at a future time, is less than that predetermined threshold. This therefore makes it possible to warn the pilot of a risk of collision between the aircraft and that vehicle, in such a way that the pilot can take the necessary measures for avoiding such a collision. The device therefore allows the pilot to better anticipate the piloting of the aircraft. Moreover it has the advantage of operating even in unfavorable meteorological conditions.

According to particular embodiments which can be taken into account in isolation or in combination:
  the situation of the aircraft information comprises the current position and speed of the aircraft and the situation of each other vehicle information comprises the current position and speed of said vehicle;
  the situation of each other vehicle information comprises the current direction of said vehicle, the predicted positions of the vehicle at the different times of the set of future times being determined along a straight trajectory corresponding to that direction;
  the situation of the aircraft information comprises moreover the current direction of the aircraft, the predicted positions of the aircraft at the different times of the set of future times being determined along a straight trajectory corresponding to that direction;
  the aircraft comprising a computer for managing the trajectory on the ground, the device for assisting taxiing is configured for acquiring, from said ground trajectory management computer, information relative to a predicted trajectory of the aircraft, the predicted positions of the aircraft at the different times of the set of future times being determined along said predicted trajectory as a function moreover of said information relative to the predicted trajectory of the aircraft;
  the vehicles of the set of vehicles are configured for transmitting information relative to their predicted trajectories and the device for assisting taxiing is configured for acquiring, from the radio communication unit, information relative to the predicted trajectory of each vehicle, the predicted positions of the vehicle at the different times of the set of future times being determined along said predicted trajectory as a function moreover of said information relative to the predicted trajectory of the vehicle;
  said display screen is a head-up display screen and said at least one indication is displayed on this screen in accordance with the position of the corresponding vehicle;
  the situation information is transmitted by the vehicle according to an ADS-B type communication.

The invention also relates to a system for assisting the taxiing of an aircraft on a surface of an airport, this system comprising:
- a unit for monitoring the situation of the aircraft;
- a radio communication unit;
- a display screen in a cockpit of the aircraft; and
- a device for assisting taxiing such as mentioned above.

The invention also relates to a method for assisting the taxiing of an aircraft, this aircraft comprising:
- a cockpit comprising a display screen;
- a unit for monitoring the situation of the aircraft; and
- a radio communication unit.

The method for assisting taxiing is noteworthy in that it comprises the following steps implemented by a device for assisting the taxiing of the aircraft:
a) acquiring, from the unit for monitoring the situation of the aircraft, situation of the aircraft information;
b) determining predicted positions of the aircraft for a set of future times, on the basis of at least said situation of the aircraft information, and for each vehicle of a set of other vehicles situated on the surface of the airport:
c) acquiring, from the radio communication unit, situation of the vehicle information transmitted by that vehicle;
d) determining predicted positions of the vehicle for that set of future times, on the basis of at least said situation of the vehicle information;
e) computing a distance between the predicted position of the aircraft and the predicted position of the vehicle for each time of the set of future times and comparing that distance with a predetermined distance threshold; and
f) emitting a warning in the cockpit of the aircraft if that distance is less than that predetermined distance threshold for at least one time of the set of future times, by displaying at least one indication on said display screen in the cockpit.

The invention also relates to an aircraft comprising a unit for monitoring the situation of the aircraft, a radio communication unit and a cockpit comprising a display screen, the aircraft comprising a device for assisting taxiing such as mentioned above. The invention also relates to an aircraft comprising a system for assisting taxiing such as mentioned above.

The invention will be better understood on reading the following description and on examination of the appended figures.

Figure 1:
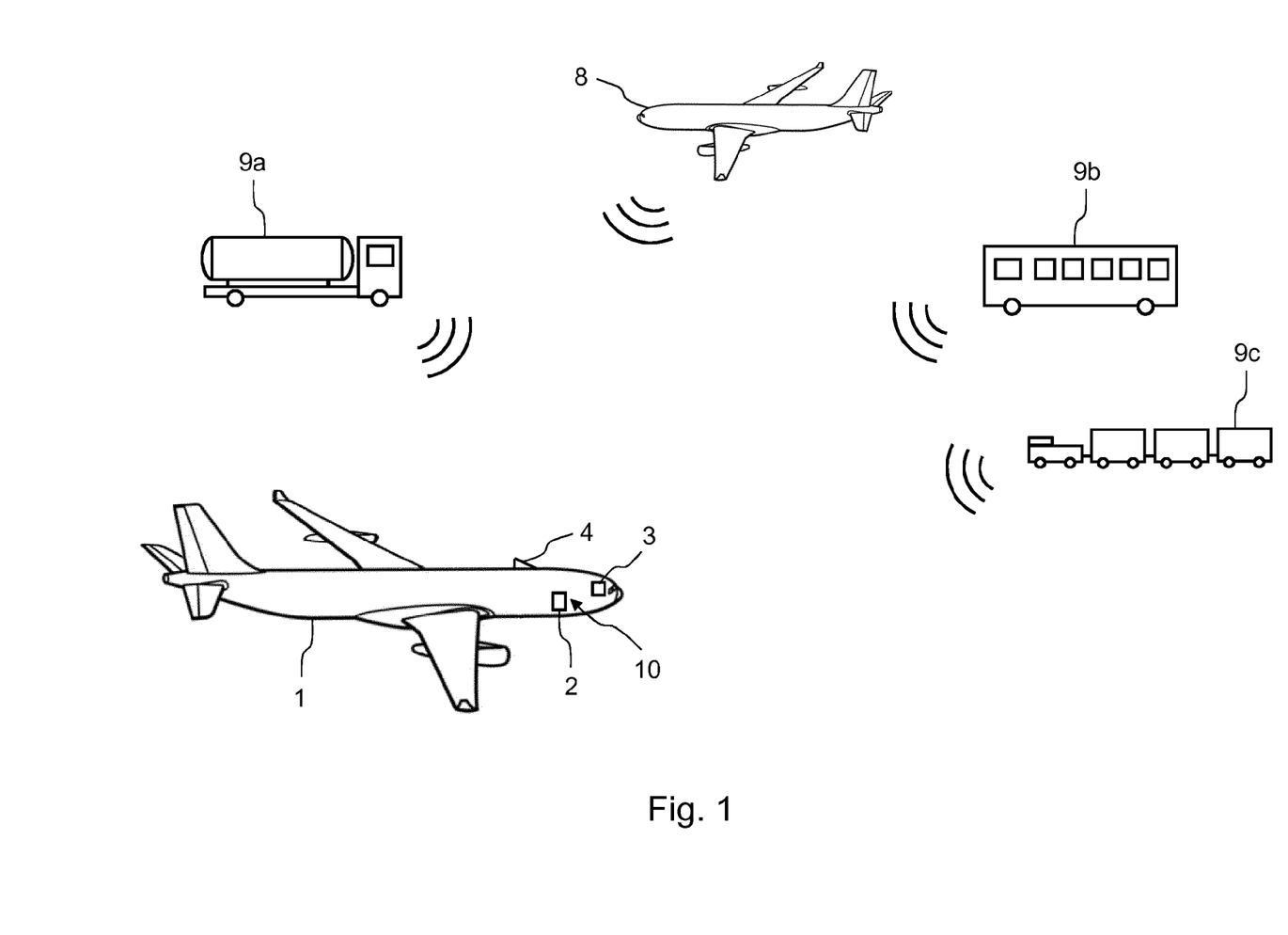
FIG. 1 is a simplified illustration of an aircraft and a set of other vehicles on an airport surface.

The aircraft 1 shown in FIG. 1 comprises an antenna 4 notably allowing ADS-B (standing for "Automatic Dependant Surveillance Broadcast" in English) type communications. The aircraft is situated on the surface of an airport, upon which it can move. Other vehicles are also present on the surface of the airport, for example another aircraft 8, a refueling tanker 9a, a bus 9b for transporting passengers between an air terminal and an aircraft, a set of baggage carts 9c, etc. These other vehicles are equipped for communicating information via ADS-B type radio frequency links. The aircraft 1 comprises a system 20 for assisting taxiing.

Figure 2:
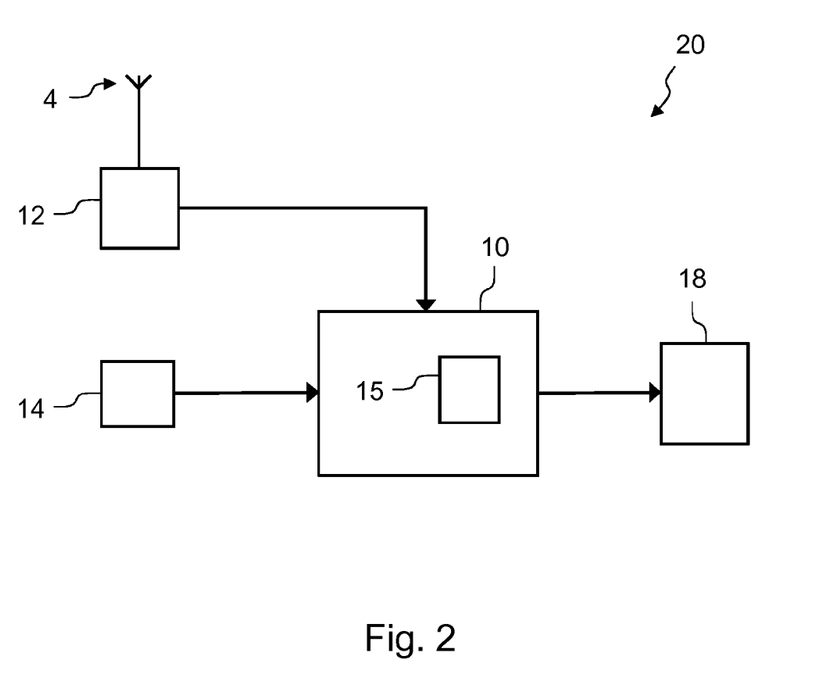
FIG. 2 shows a system for assisting taxiing according to one embodiment of the invention.

As shown in FIG. 2, the system 20 for assisting taxiing comprises a device 10 for assisting taxiing, a unit 14 for monitoring the situation of the aircraft, a radio communication unit 12 and a screen 18. The unit 14 for monitoring the situation of the aircraft can notably correspond to an inertial system of the aircraft, to an ADIRS (standing for "Air Data Inertial Reference System" in English) unit simultaneously delivering inertial information and anemo-barometric information of the aircraft, or to an MMR (standing for "Multi-Mode Receiver" in English) multimode receiver grouping an inertial or ADIRS system together with a GNSS (standing for "Global Navigation Satellite System" in English) satellite navigation receiver, for example of the GPS type. The device 10 for assisting taxiing is connected to the unit 14 for monitoring the situation of the aircraft and to the radio communication unit 12 of the aircraft. The radio communication unit 12 is connected to the antenna 4 of the aircraft. The device 10 for assisting taxiing is also connected to the screen 18, which can be situated in a cockpit of the aircraft. The device 10 for assisting taxiing comprises a processing unit 15, for example a processor or a microprocessor. This device 10 for assisting taxiing can in particular be integrated in an avionics bay 2 of the aircraft.

When operating, the device 10 for assisting taxiing acquires, from the unit 14 for monitoring the position of the aircraft, information relative to the situation of the aircraft on the surface of the airport. On the basis of said information, the device 10 determines, with the help of its processing unit 15, predicted positions of the aircraft 1 for a set of future times. These predicted positions can notably correspond to predicted positions of the aircraft along a predicted trajectory of the aircraft determined by the processing unit 15 as a function of said information. The different times of the set of future times for which these predicted positions are determined can for example be uniformly distributed over a determined time span. In order to avoid generating too high a number of inopportune warnings, this time span can for example be chosen to be equal to 30 seconds, the different times being distributed every 2 seconds over that time span. The number of times for which the device 10 for assisting taxiing determines these predicted positions is therefore equal to 15.

Moreover, the other vehicles present on the surface of the airport transmit situation information concerning them, via ADS-B type radio frequency links. This information is received by the radio communication unit 12, via the antenna 4 and then it is acquired by the device 10 for assisting taxiing. Several embodiments can be envisaged for the acquisition of said information by the device 10 for assisting taxiing. According to a first embodiment, this information is stored in the radio communication unit, which transmits it to the device 10 for assisting taxiing at the request of the latter. According to another embodiment, when it receives information coming from the other vehicles, the radio communication unit 12 broadcasts this information on a communication network of the aircraft to which the device 10 for assisting taxiing is also connected, and this device acquires and stores this information. The device 10 for assisting taxiing carries out the acquisition of said situation information for each of the other vehicles present on the surface of the airport and which transmit such information. On the basis of said information, the device 10 determines, with the help of its processing unit 15, predicted positions of each vehicle for said set of future times. For each of the other vehicles, the device 10 for assisting taxiing computes, for each of said times, a distance between the predicted position of the aircraft and the predicted position of the vehicle at that time and then it compares that distance with a predetermined distance threshold. If a computed distance is less than this predetermined distance threshold, the device 10 for assisting taxiing emits a warning in the cockpit of the aircraft. In order to do this, it transmits an item of information to a computer associated with the screen 18 situated in the cockpit, in order to display a warning indication on that screen.

A predicted position of the aircraft can for example correspond to a position of the center of gravity of the aircraft or again to a position of a part situated at the front of the aircraft. The choice of a position corresponding to the center of gravity is advantageous in that this position is close to the wings of the aircraft, which allows a better protection against a risk of collision between the wings and another vehicle. The choice of a position corresponding to a front part of the aircraft is in turn advantageous in that it allows a better protection against a risk of collision between a front part of the aircraft and another vehicle. A predicted position of another vehicle can for example correspond to a position of the center of gravity of the vehicle or again to a position of a part situated at the front of the vehicle. These examples of predicted position of the aircraft and of another vehicle are given by way of illustration and other positions can be chosen without departing from the scope of the invention. It is also possible to determine several predicted positions of the aircraft and/or of another vehicle, these predicted positions corresponding to several parts of the aircraft or of the vehicle. For example, for the aircraft, it can be advantageous to determine four predicted positions corresponding to a front part of the aircraft, to the ends of the two wings and to a rear part of the aircraft. These four positions have the advantage of corresponding to the principal extremities of the aircraft. The computation of distances between these four positions and the predicted positions of other vehicles allows better protection of the aircraft against risks of collision. When the predicted position corresponds to the center of gravity of the aircraft, the predetermined distance threshold can for example be chosen to be equal to 100 meters, in order to take account of the wingspan and of the length of the aircraft.

Advantageously, the situation of the aircraft information comprises the current speed and position of the aircraft and the situation information of each other vehicle comprises the current speed and position of said vehicle.

Figure 3:
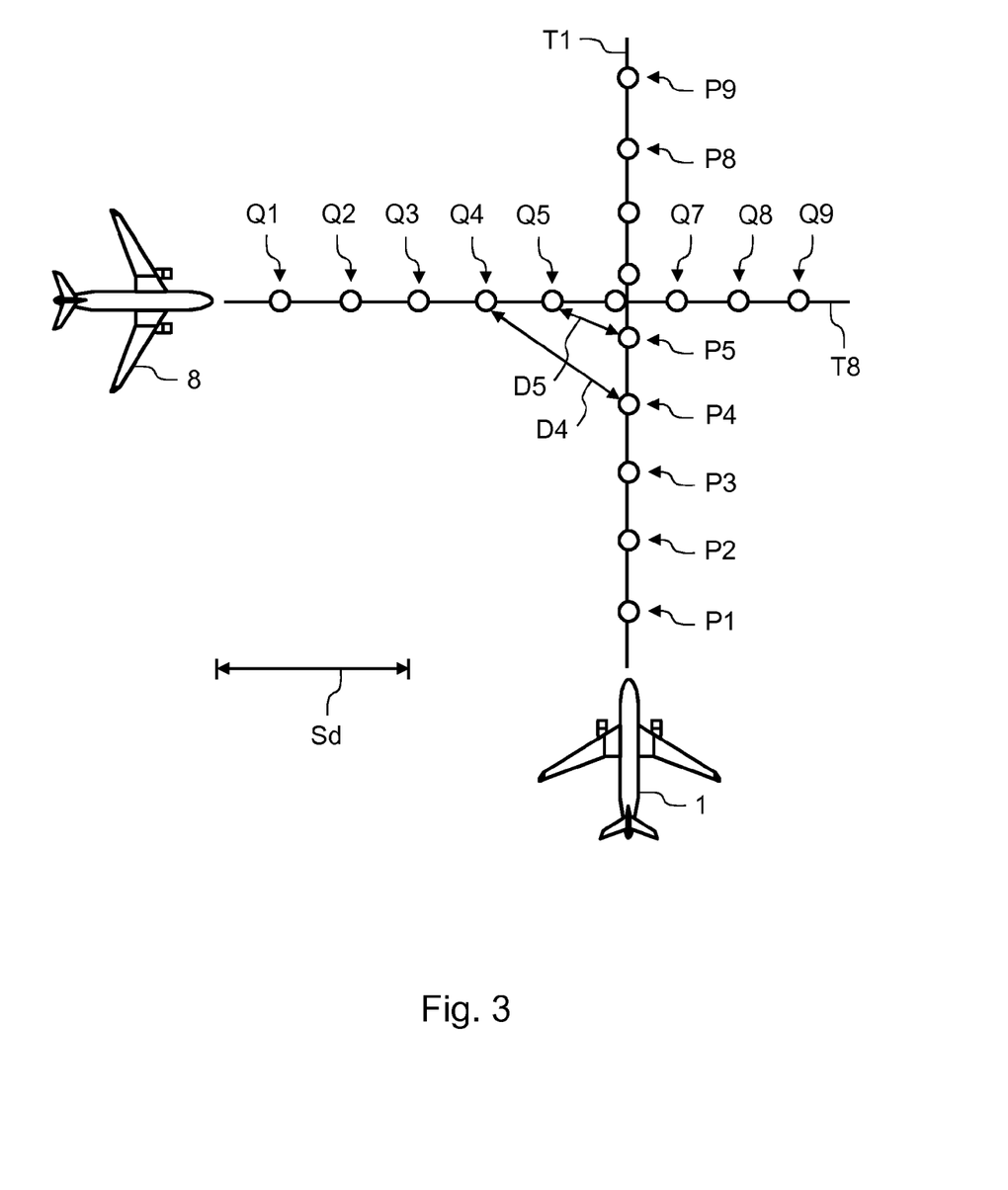
FIG. 3 illustrates an example of determining predicted positions of two aircraft on an airport surface, according to one embodiment of the invention.

In an embodiment shown in FIG. 3, the situation information of the aircraft 1 comprises moreover the current direction of the aircraft. This current direction can be expressed in the form of a heading angle or of a current route angle of the aircraft. The predicted positions P1, P2, . . . P9 of the aircraft 1 corresponding to the different times of the set of future times are determined along a straight trajectory T1 corresponding to that current direction. The number of future times, and therefore of predicted positions, has been limited to 9 in order not to overload the figure. In the figure, the aircraft 1 is shown in its current position. The current speed is used for determining the different positions P1, P2, . . . P9 along the trajectory T1, assuming that the speed of the aircraft remains constant. The other vehicle shown in this figure corresponds to another aircraft 8. For this other aircraft, the situation information also comprises, in addition, the current direction of said aircraft 8. The predicted positions Q1, Q2, . . . Q9 of the aircraft 8 corresponding to the different times of the set of future times are determined along a straight trajectory T8 corresponding to that current direction. The device 10 for assisting taxiing computes distances between the predicted positions of the aircraft 1 and the other aircraft 8 for each of said times. It thus computes distances D1 between the positions P1 and Q1, D2 between P2 and Q2, . . . D9 between P9 and Q9. For the sake of clarity of the figure, only the distances D4 and D5 are shown. The distances D4 and D5, and the distances D6 and D7, which are not shown, are shorter than a predetermined distance threshold Sd. Consequently, the device 10 for assisting taxiing, which compares each of the distances D1 to D9 with this predetermined distance threshold, sends an item of information to the computer associated with the screen 18 in order to display a warning indication on the screen 18 in the cockpit 3 of the aircraft 1.

The computations can be carried out as indicated below. In order to do this, the coordinates of the aircraft 1 and of another vehicle, such as for example the other aircraft 8, are defined in a two-dimensional Cartesian frame of reference defined by two axes X and Y in a plane corresponding to the surface of the airport. The current position of the aircraft 1 is defined by its coordinates $x_1^0$ and $y_1^0$ in this frame of reference. The current position of the other aircraft 8 is defined by its coordinates $x_8^0$ and $y_8^0$ in this frame of reference.

The coordinates of the predicted position Pk of the aircraft 1 at a time k in the set of future times can be defined by the following system of equations:

$$\begin{cases} x_1^k = x_1^0 + d_1 \cdot \cos(\varphi_1) \\ y_1^k = y_1^0 + d_1 \cdot \sin(\varphi_1) \end{cases} \quad (1)$$

in which:
  $\varphi_1$ is a heading or route angle corresponding to the current direction of the aircraft 1; and
  $d_1$ is the distance between the current position of the aircraft 1 and said predicted position Pk, this distance being computed using the following equation:

$$d_1 = V_1 \times k \times \Delta t \quad (2)$$

in which:
  $V_1$ is the speed of the aircraft 1 along its longitudinal axis; and
  $\Delta t$ is the time interval between two consecutive times of the set of future times.

In the particular case where said situation information comprises moreover the current acceleration $a_1$ of the aircraft 1 along its longitudinal axis, the distance $d_1$ can be computed using the following equation:

$$d_1 = V_1 \times k \times \Delta t + \tfrac{1}{2} \times a_1 \times (k \times \Delta t)^2 \quad (3)$$

The coordinates of the predicted position Qk of the other aircraft 8 at a time k in the set of future times can, as for them, be defined by the following system of equations:

$$\begin{cases} x_8^k = x_8^0 + d_8 \times \cos(\varphi_8) \\ y_8^k = y_8^0 + d_8 \times \sin(\varphi_8) \end{cases} \quad (4)$$

in which:
  $\varphi_8$ is a heading or route angle corresponding to the current direction of the other aircraft 8; and
  $d_8$ is the distance between the current position of the other aircraft 8 and said predicted position Qk, this distance being computed using the following equation:

$$d_8 = V_8 \times k \times \Delta t \quad (5)$$

in which:

$V_8$ is the speed of the aircraft 8 along its longitudinal axis.

The distance Dk between the predicted position Pk of the aircraft 1 and the predicted position Qk of the other aircraft 8 at the time k can be computed using the following equation:

$$D_k = \sqrt{(x_1^k - x_8^k)^2 + (y_1^k - y_8^k)^2} \quad (6)$$

When $D_k < S_d$ for at least one time k in the set of future times, then the device 10 for assisting taxiing sends an item of information to the computer associated with the screen 18 in order to display a warning indication on the screen 18 in the cockpit 3 of the aircraft 1.

Figure 4:
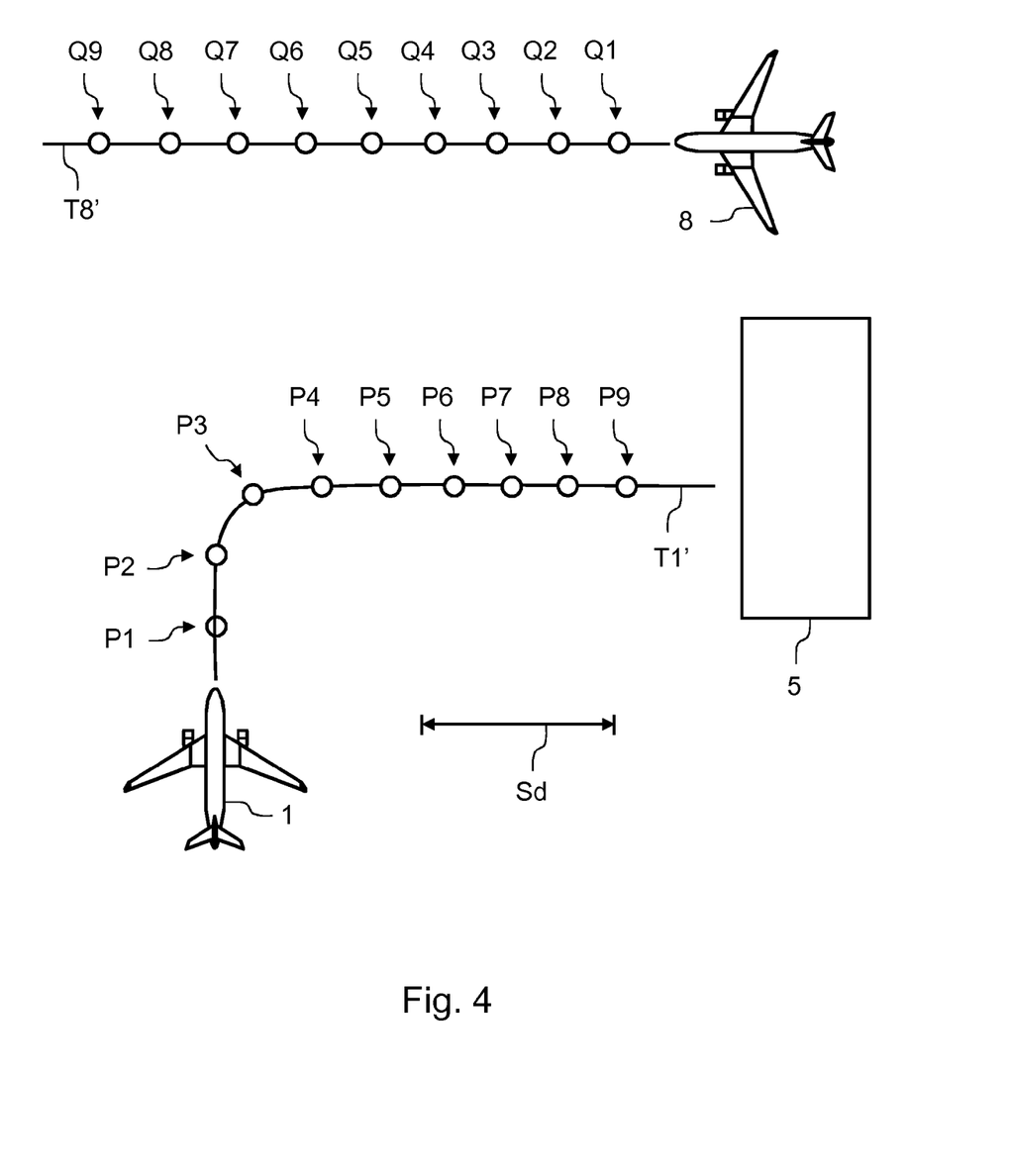
FIG. 4 illustrates an example of determination of predicted positions of two aircraft on an airport surface according to another embodiment of the invention.

In another embodiment shown in FIG. 4, the aircraft 1 comprises a computer for managing the trajectory on the ground and the device 10 for assisting taxiing is configured for acquiring, from said computer for managing the trajectory on the ground, information relative to a predicted trajectory T1'. In the example shown in the figure, this trajectory allows the aircraft 1 to join an airport terminal 5. The device 10 for assisting taxiing determines the predicted positions P1, P2, . . . P9 of the aircraft, for the different times of the set of future times, along said predicted trajectory as a function of the current position, of the current speed and of said information relative to the predicted trajectory of the aircraft. As in the embodiment shown in FIG. 3, the predicted positions Q1, Q2, . . . Q9 of the other aircraft 8 are determined along a straight trajectory T8' corresponding to the current direction of the aircraft 8. Such an embodiment has the advantage of determining the predicted positions of the aircraft 1 along the trajectory T1' actually provided for the taxiing of the aircraft. Thus, in the example shown in the figure, the different distances D1 to D9 are all longer than the predetermined distance threshold Sd and no warning is therefore emitted in the cockpit of the aircraft. Such an embodiment therefore has the advantage of avoiding inopportune emissions of warnings in the cockpit.

In another embodiment, not shown in the figures, at least a portion of the vehicles among all of the other vehicles are configured for transmitting, via ADS-B type radio frequency links, information relative to their predicted trajectories and the device for assisting taxiing is configured for acquiring, from the radio communication unit, information relative to the predicted trajectory of each of said vehicles, the predicted positions of the vehicle at the different times of the set of future times being determined along said predicted trajectory as a function of its current position, of its current speed and of said information relative to the predicted trajectory of the vehicle. This other embodiment can be combined with the determination of the predicted positions of the aircraft 1 along a straight trajectory corresponding to its current direction, as shown in FIG. 3, or preferably with the determination of said predicted positions of the aircraft 1 along a predicted trajectory of said aircraft 1, as shown in FIG. 4. In the second case, the predicted positions, of both the aircraft 1 and of the other vehicle, are determined along real predicted trajectories, which makes it possible to improve the relevance of the warnings likely to be emitted in the cockpit.

In a particular embodiment, the display screen 18 is a head-up display screen and, during a warning, said at least one indication is displayed on that screen such that it is in accordance with the position of the corresponding vehicle, that is to say by superimposition of said vehicle so that it can be seen by a pilot of the aircraft through the windscreen of the aircraft. Thus, when the pilot of the aircraft looks outside of the aircraft through the windscreen, this indication allows him to identify immediately a vehicle for which there exists a potential risk of collision. This allows the pilot to take the appropriate measures to avoid such a collision, for example by slowing down or stopping the aircraft 1.

The invention claimed is:

1. A device for assisting the taxiing of an aircraft on the surface of an airport, the aircraft comprising a cockpit comprising a display screen; a unit for monitoring the situation of the aircraft; and a radio communication unit, wherein the device for assisting taxiing is configured for:
   a) acquiring, from the unit for monitoring the situation of the aircraft, situation of the aircraft information;
   b) determining predicted positions of the aircraft for each time of a set of future times, on the basis of at least said situation of the aircraft information, wherein the predicted positions of the aircraft are defined by coordinates $x_1^0$ and $y_1^0$ in a two-dimensional Cartesian frame of reference defined by two axes X and Y in a plane corresponding to the surface of airport and wherein the coordinates of the predicted positions $p_k$, of the aircraft at a time k in the set of future times is defined by the following system of equations:

$$x_1^k = x_1^0 + d_1 \cdot \cos(\varphi_1)$$

$$x_1^k = x_1^0 + d_1 \cdot \sin(\varphi_1)$$

in which:
   $\varphi_1$ is a heading or route angle corresponding to a current direction of the aircraft; and
   $d_1$ is a distance between a current position of the aircraft and said predicted position $p_k$; and
   for each vehicle of a set of other vehicles situated on the surface of the airport:
   c) acquiring, from the radio communication unit, situation of the vehicle information transmitted by that vehicle;
   d) determining predicted positions of the vehicle for each time of the set of future times, on the basis of at least said situation of the vehicle information;
   e) computing a distance between the predicted position of the aircraft and the predicted position of the vehicle for each time of the set of future times and comparing that distance with a predetermined distance threshold; and
   f) emitting a warning in the cockpit of the aircraft if that distance is less than that predetermined distance threshold for at least one time of the set of future times, by displaying at least one indication on said display screen in the cockpit.

2. The device as claimed in claim 1, wherein said situation of the aircraft information comprises the current position and speed of the aircraft and the situation of each other vehicle information comprises the current position and speed of said vehicle.

3. The device as claimed in claim 2, wherein the situation of each other vehicle information comprises the current direction of said vehicle, the predicted positions of the vehicle at the different times of the set of future times being determined along a straight trajectory corresponding to that direction.

4. The device as claimed in claim 2, wherein said situation of the aircraft information further comprises the current direction of the aircraft, the predicted positions of the aircraft at the different times of the set of future times being determined along a straight trajectory corresponding to that direction.

5. The device as claimed in claim 2, wherein the aircraft comprises a computer for managing the trajectory on the ground, and wherein the device for assisting taxiing is further configured for acquiring, from said ground trajectory management computer, information relative to a predicted trajectory of the aircraft, the predicted positions of the aircraft at the different times of the set of future times being determined along said predicted trajectory as a function moreover of said information relative to the predicted trajectory of the aircraft.

6. The device as claimed in claim 4, wherein the vehicles of the set of vehicles are configured for transmitting information relative to their predicted trajectories and the device for assisting taxiing is configured for acquiring, from the radio communication unit, information relative to the predicted trajectory of each vehicle, the predicted positions of the vehicle at the different times of the set of future times being determined along said predicted trajectory as a function moreover of said information relative to the predicted trajectory of the vehicle.

7. The device as claimed in claim 1, wherein said display screen is a head-up display screen and said at least one indication is displayed on the screen in accordance with the position of the corresponding vehicle.

8. The device as claimed in claim 1, wherein the situation information is transmitted by the vehicle according to an ADS-B type communication.

9. A system for assisting the taxiing of an aircraft on a surface of an airport, the system comprising:
  a unit for monitoring the situation of the aircraft;
  a radio communication unit;
  a display screen in a cockpit of the aircraft; and
  a device for assisting taxiing the device for assisting taxiing is configured for:
    a) acquiring, from the unit for monitoring the situation of the aircraft, situation of the aircraft information;
    b) determining predicted positions of the aircraft for each time of a set of future times, on the basis of at least said situation of the aircraft information, wherein the predicted positions of the aircraft are defined by coordinates $x_1^0$ and $y_1^0$ in a two-dimensional Cartesian frame of reference defined by two axes X and Y in a plane corresponding to the surface of airport and wherein the coordinates of the predicted positions $p_k$ of the aircraft at a time k in the set of future times is defined by the following system of equations:

$$x_1^k = x_1^0 + d_1 \cdot \cos(\varphi_1)$$

$$x_1^k = x_1^0 + d_1 \cdot \sin(\varphi_1)$$

in which:
    $\varphi_1$ is a heading or route angle corresponding to a current direction of the aircraft; and
    $d_1$ is a distance between a current position of the aircraft and said predicted position $p_k$; and
  for each vehicle of a set of other vehicles situated on the surface of the airport:
    c) acquiring, from the radio communication unit, situation of the vehicle information transmitted by that vehicle;
    d) determining predicted positions of the vehicle for each time of the set of future times, on the basis of at least said situation of the vehicle information;
    e) computing a distance between the predicted position of the aircraft and the predicted position of the vehicle for each time of the set of future times and comparing that distance with a predetermined distance threshold; and
    f) emitting a warning in the cockpit of the aircraft if that distance is less than that predetermined distance threshold for at least one time of the set of future times, by displaying at least one indication on said display screen in the cockpit.

10. A method for assisting the taxiing of an aircraft, the aircraft comprising a cockpit comprising a display screen, a unit for monitoring the situation of the aircraft, and a radio communication unit, said method comprises the following steps implemented by a device for assisting the taxiing of the aircraft:
    a) acquiring, from the unit for monitoring the situation of the aircraft, situation of the aircraft information;
    b) determining predicted positions of the aircraft for each time of a set of future times, on the basis of at least said situation of the aircraft information, wherein the predicted positions of the aircraft are defined by coordinates $x_1^0$ and $y_1^0$ in a two-dimensional Cartesian frame of reference defined by two axes X and Y in a plane corresponding to the surface of airport and wherein the coordinates of the predicted positions $p_k$ of the aircraft at a time k in the set of future times is defined by the following system of equations:

$$x_1^k = x_1^0 + d_1 \cdot \cos(\varphi_1)$$

$$x_1^k = x_1^0 + d_1 \cdot \sin(\varphi_1)$$

in which:
    $\varphi_1$ is a heading or route angle corresponding to a current direction of the aircraft; and
    $d_1$ is a distance between a current position of the aircraft and said predicted position $p_k$, and
  for each vehicle of a set of other vehicles situated on the surface of the airport:
    c) acquiring, from the radio communication unit, situation of the vehicle information transmitted by that vehicle;
    d) determining predicted positions of the vehicle for each time of the set of future times, on the basis of at least said situation of the vehicle information;
    e) computing a distance between the predicted position of the aircraft and the predicted position of the vehicle for each time of the set of future times and comparing that distance with a predetermined distance threshold; and
    f) emitting a warning in the cockpit of the aircraft if that distance is less than that predetermined distance threshold for at least one time of the set of future times, by displaying at least one indication on said display screen in the cockpit.

* * * * *